United States Patent Office.

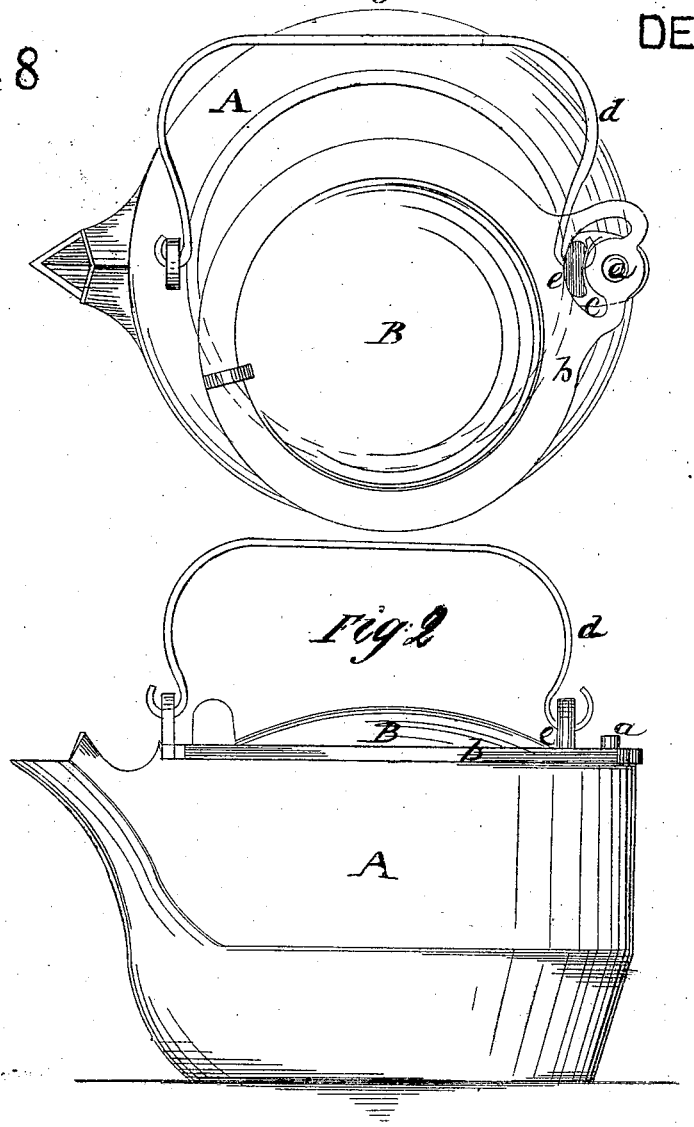

C. C. HARE AND S. J. HARE, OF LOUISVILLE, KENTUCKY

Letters Patent No. 71,748, dated December 3, 1867.

HINGING TEA-KETTLE LIDS.

*The Schedule referred to in these Letters Patent and making part of the same.*

TO ALL WHOM IT MAY CONCERN:

Be it known that we, C. C. HARE and S. J. HARE, of Louisville, in the county of Jefferson, and State of Kentucky, have invented a new and useful Improvement in Tea-Kettle with a Swinging Lid; and we do hereby declare that the following is a full, clear, and exact description thereof, which will enable others skilled in the art to make and use the same, reference being had to the accompanying drawings, in which—

Figure 1 is a top view of a tea-kettle having our improved swinging-lid connection.

Figure 2 is a side view of the same.

Similar letters of reference indicate like parts.

This invention relates to a new and useful device for attaching a swinging lid to a tea-kettle; and consists in connecting the lid to the kettle by a pivot on one side, with a curved slot in the lid fitted on the ear of the kettle, so that it shall be held in place by the bail, and turn either way horizontally, for the purpose of opening and closing the kettle, thus constructing the kettle and lid in the simple stand cheapest manner, with only two castings, and dispensing with wrought-iron lugs, loose washers, and screws or loose ears or washers, usually employed for connecting a swinging lid to a kettle.

A represents an ordinary tea-kettle, and B the swinginging lid, which is pivoted to the kettle by the pin $a$, which may be fastened upon either the lid or the kettle. The lid is made with a flat rim, $b$, having a projection on the side, in which is a semicircular slot $c$, that slips over the ear $e$, which is curved to fit the shape of the slot, and allow the lid to turn upon it freely in either direction to one side, so as to open the top of the kettle as desired, while at the same time the lid is held down in place by the end of the bail $d$, that is hooked in the ear $e$, and acts as a washer.

The simplicity of this arrangement, and its effective and easy operation, are obvious.

What we claim as new, and desire to secure by Letters Patent, is—

1. Making a tea-kettle with a swinging lid in two pieces, connected and operating as herein described.

2. A swinging lid, having a curved or semicircular slot, $c$, in the rim $b$, in combination with the ear $e$, the bail $d$, and the pin $a$ of a tea-kettle, arranged and operating as herein described.

C. C. HARE,
S. J. HARE.

Witnesses:
Jos. CLEMENT,
G. B. HART.